June 4, 1963
C. T. McGILL
3,092,574
AUTOMATIC FLOW CONTROL MEANS FOR
LIQUID TREATING APPARATUS
Filed Oct. 3, 1957
4 Sheets-Sheet 4
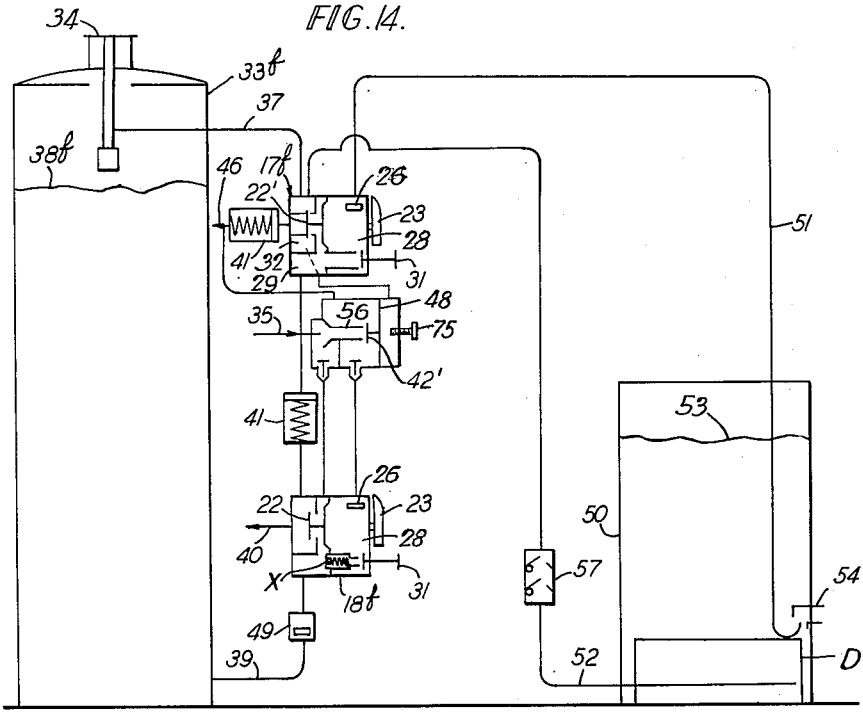
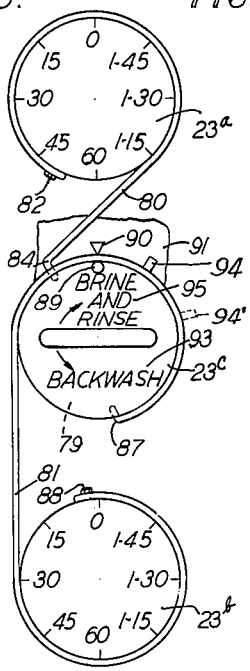
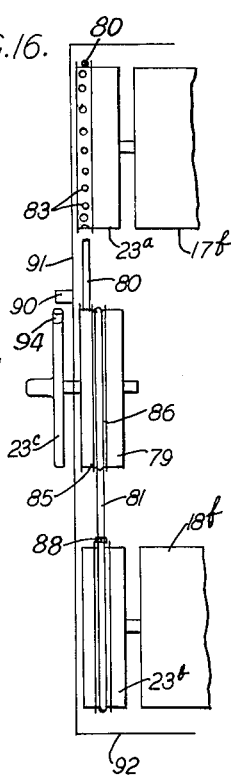
INVENTOR
CHESTER T. McGILL
BY
ATTORNEY United States Patent Office 3,092,574
Patented June 4, 1963

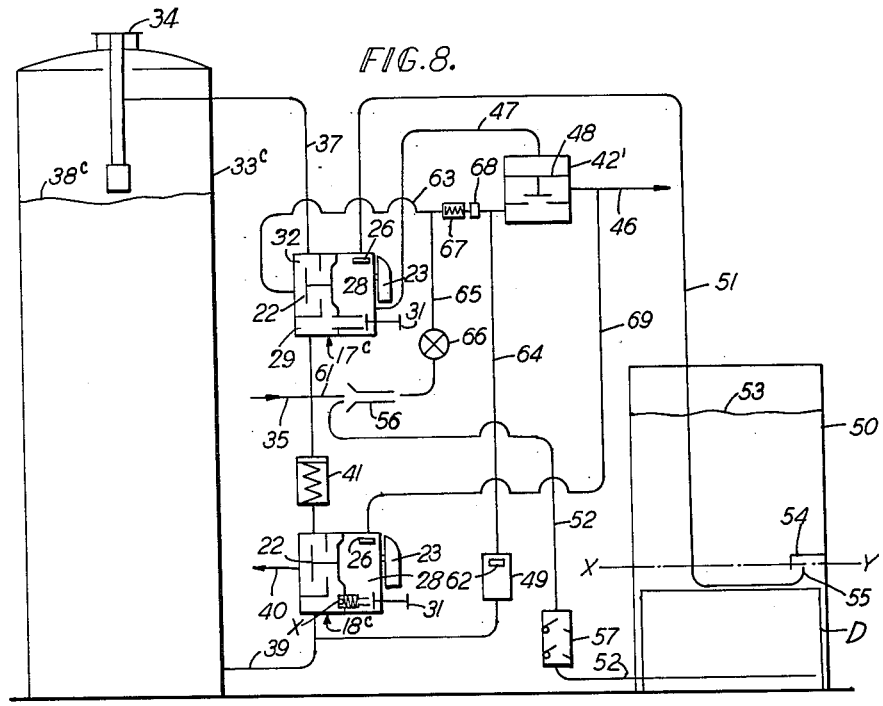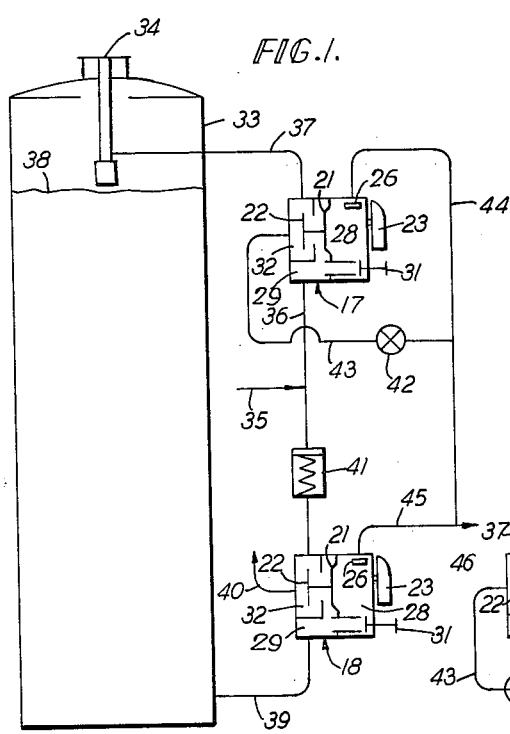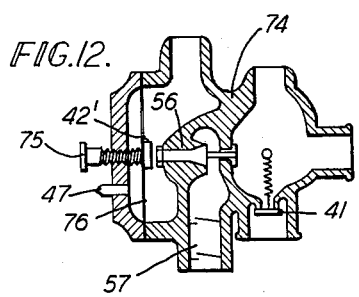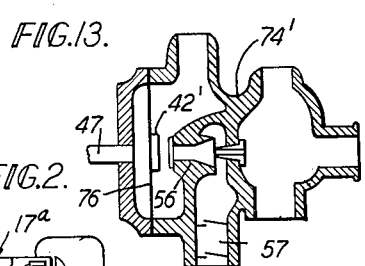

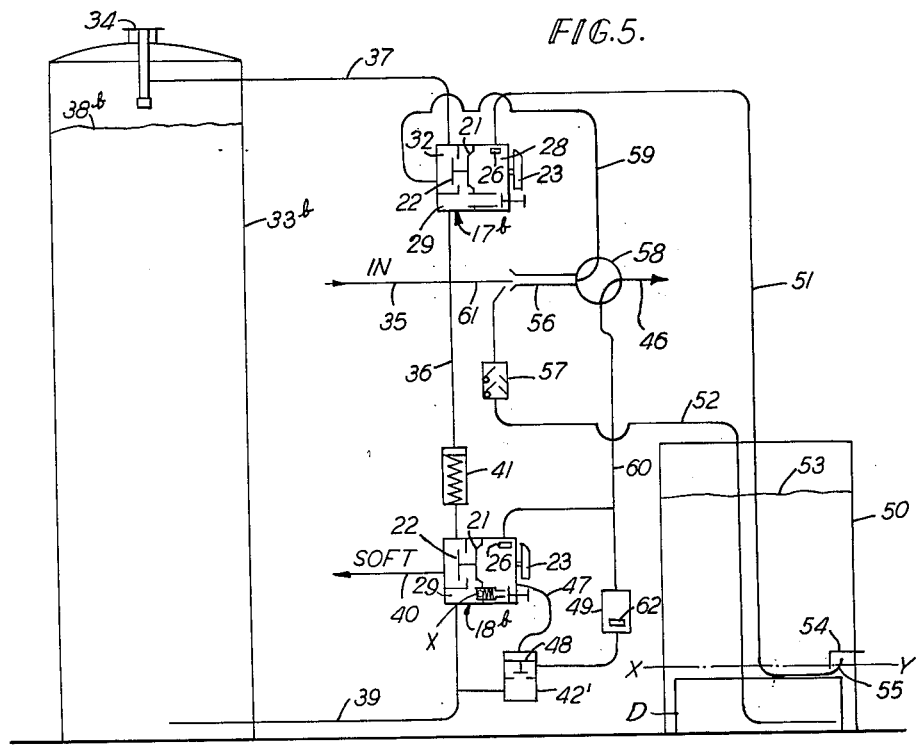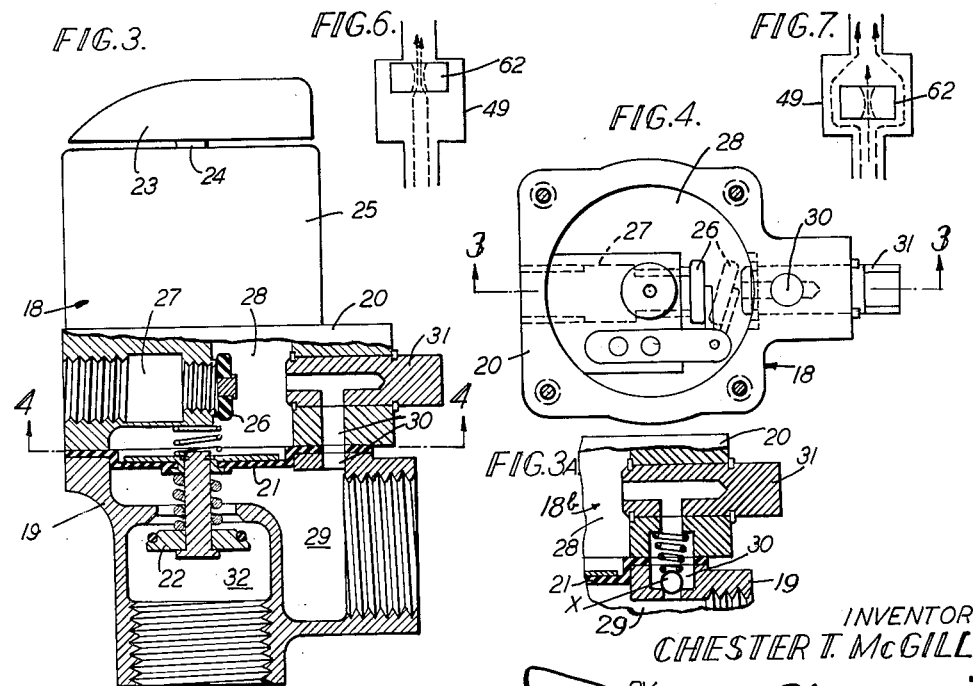

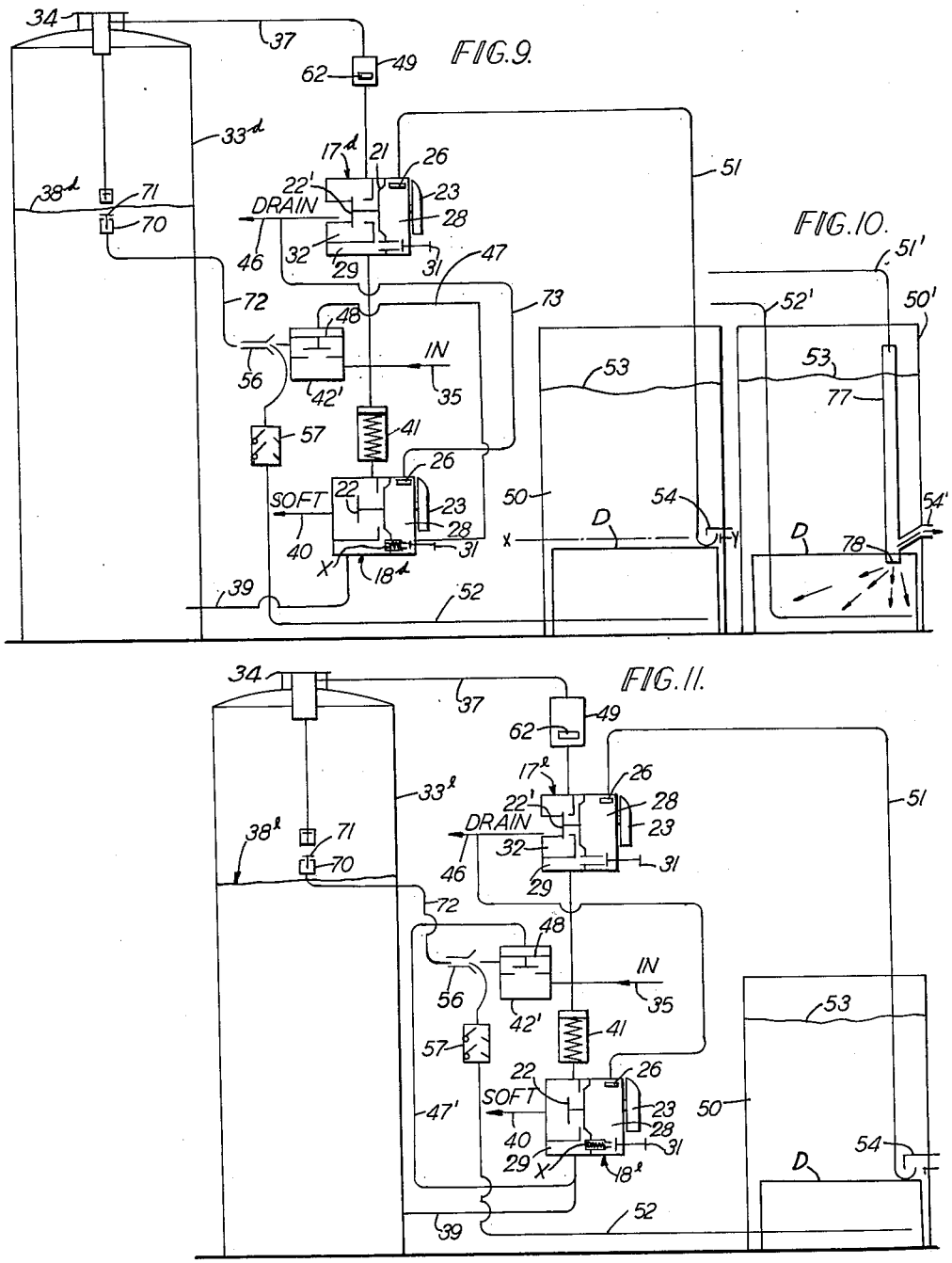

3,092,574
AUTOMATIC FLOW CONTROL MEANS FOR
LIQUID TREATING APPARATUS
Chester T. McGill, Elgin, Ill.
(134 N. Grove Ave., Rockford, Ill.)
Filed Oct. 3, 1957, Ser. No. 688,058
28 Claims. (Cl. 210—130)

This invention relates to automatic flow control means for liquid treating apparatus, the same having been designed more specifically for use with base exchange water softeners but adapted to be used with filters and liquid treating apparatus generally.

Liquid treating apparatus, as heretofore designed, have been objectionable because the flow control means employed consisted usually of a large number of valves which the user was expected to operate to change from service to back-wash and then to brining and rinsing and finally back to service again. Where an effort was made to eliminate the manual operation of valves so as to avoid the danger of certain valves not being operated at all or not in the proper timed relationship to the others for best results, semi-automatic flow control means was provided consisting usually of electrical devices such as motors and clocks, with the result that the total cost of such an installation was too high for the average home use and there was also too much likelihood of one or more of the parts of the complicated equipment failing to function properly so that service costs were prohibitive. It is, therefore, the principal object of my invention to provide automatic flow control means affording all of the advantages desired without the disadvantages mentioned, by virtue of the employment of which require only manual setting, the operation thereafter being entirely automatic and involving a minimum amount of mechanism, and hence much less likelihood of mechanical defects causing service difficulties.

A salient feature of the present invention is the use of two time-controlled valve units, each having its own separately settable timer, the two valve units being connected together in a novel way so that a softener connected with a source of raw water supply under pressure, a service system, and a drain can be regenerated by proper setting of the two timers in a predetermined time relationship to one another, and the regeneration is taken care of automatically and the softener returned thereafter to service without any other manual operation being required, thus reducing the chance of any miscue to a minimum. Since backwashing is no longer considered necessary with each regeneration, that is omitted where the two timers are set for a regeneration, but a backwash can be obtained alone by setting the timer of only one of the two valve units, and, there again, the softener is automatically returned to service thereafter, and if the softener is then to be regenerated, the timers for both valve units are set as previously mentioned for a completely automatic regeneration and return to service. The operator, in other words, takes care of everything by merely setting the one timer, or both timers, depending upon whether only a backwash is desired, or a complete regeneration without a backwash, and he never has to worry that something might go wrong if, through an oversight, he fails to return at the right time later to perform a necessary further operation of a valve or valves. There is nothing else requiring manual operation after the cycle is started.

Another salient feature of the invention is the provision in connection with each of the timer controlled automatic valves of a pressure responsive diaphragm which, prior to the setting of the timer, is normally held under pressure in one position but arranged, when the timer is set, immediately to be operated hydraulically to its other operative position by reason of the opening of a small pilot valve and remain in that position for the predetermined time for which the timer is set. Valves of this general type with associated timers have been obtainable for years for entirely unrelated purposes and given fool-proof operation in various kinds of installations but, to my knowledge, there have never been any combinations like the ones disclosed herein used for automatic hydraulic control of the regeneration or of the backwashing alone of water conditioning apparatus or filters.

The invention is illustrated in the accompanying drawings, in which—

FIG. 1 is a diagrammatic illustration of an internal salting type water softener of the base exchange type having automatically timed flow control means connected therewith in accordance with my invention;

FIG. 2 is a diagrammatic showing of one of the two timers of FIG. 1 combined with a hydraulic valve in lieu of the manual valve shown in FIG. 1, to simplify the operation;

FIG. 3 is a view partly in side elevation and partly in longitudinal section of an actual timer like the two diagrammatically illustrated in FIG. 1, the section being on the line 3—3 of FIG. 4;

FIG. 3a is a sectional detail related to FIG. 3, illustrating a check valve X incorporated in the lower one of the two timer valves in FIGS. 5, 8, 9, 11 and 14.

FIG. 4 is a section on the line 4—4 of FIG. 3;

FIG. 5 is a diagrammatic illustration of another base exchange water softener with an associated brine tank showing similar automatically timed flow control means as in FIG. 1 connected therewith in accordance with my invention;

FIGS. 6 and 7 are enlarged diagrammatic illustrations of the flow regulator shown in FIG. 5, FIG. 6 showing the regulator in the position for regulating rinse flow, whereas FIG. 7 shows it in position during brine flow;

FIG. 8 is a view similar to FIG. 5, showing another modification;

FIG. 9 is a view similar to FIG. 8, showing still another modification;

FIG. 10 is a diagrammatic view of a brine tank, similar to that of FIG. 9, but showing an alternative or modified construction;

FIG. 11 is another view similar to FIG. 9, showing still another modification;

FIGS. 12 and 13 are sections through two composite valve structures, FIG. 12 being related to FIG. 9, showing how four of the units therein disclosed may be incorporated in a unitary assembly, and FIG. 13 being correspondingly related to FIG. 11;

FIG. 14 is a diagrammatic view of still another automatically timed flow control means made in accordance with my invention shown connected with a dry salt type brine tank and a softener in the same manner as the flow control means of FIGS. 8, 9 and 11;

FIG. 15 is a front view of the interconnected upper and lower timers of FIG. 14, and FIG. 16 is a side view of FIG. 15, indicating diagrammatically how the timers and their connections may be concealed in a housing leaving only the control dial exposed for operation.

Similar reference numerals are applied to corresponding parts throughout the views.

Referring briefly to FIGS. 1, 3 and 4, two time control units or semi-automatic valves are indicated diagrammatically in FIG. 1 by reference numerals 17 and 18, which may be of different construction but are here shown as of identical construction and, hence, a disclosure of the details of one, as shown in FIGS. 3 and 4, will suffice for both. Each of these units comprises a two-piece valve body 19—20 with a rubber diaphragm 21 clamped therebetween by its marginal edge portion and operatively connected centrally thereof with the stem of a poppet valve 22. So long as the manual set knob 23 on the outer end of a stem 24 that extends into the timer housing 25 is in "off" position a pilot valve 26, which may be of any suitable type but is here shown as a flap valve, remains seated to close off pressure relief passage 27 to maintain a predetermined pressure in chamber 28, the latter having communication with chamber 29 through registering ports 30 in the two parts of the valve body and a registering passage in regulating cock 31, so that the pressure responsive diaphragm 21 holds the valve 22 open, allowing free flow from chamber 29 into chamber 32. However, the instant that the knob 23 is turned from the "off" position and set for a given time during which the valve 22 is to remain closed, pilot valve 26, which is operated by the clock mechanism in the timer housing 25, is opened, as indicated in dotted lines in FIG. 4, and remains open for the set time, and, due to the pressure differential between chambers 28 and 29, the diaphragm 21 reverses its position and closes the valve 22.

Referring to FIG. 1, 33 designates an internal salting type downflow water softener, and 34 is the cap on top that is removed to permit introduction of the salt. 35 is the raw water inlet pipe which is connected as at 36 to the chamber 29 in unit 17, and, assuming both knobs 23 are turned to off position, so that the pilot valves 26 are closed and valves 22 are open, the raw water is delivered from chamber 32 through pipe 37 into the top of the tank 33 for flow downwardly through the bed of mineral indicated at 38. The softened water leaves the bottom of the tank through pipe 39 and, valve 22 in unit 18 being open, the softened water is delivered to the service system through pipe 40. 41 is a spring-loaded differential valve, the spring pressure in which is such as to set up a resistance to flow slightly higher than the pressure drop through the softener 33 so that in normal operation of the softener no water flows through this bypass. However, when valves 22 in units 17 and 18 are closed, as during regeneration of the softener, raw water from line 35 may be drawn through the bypass valve 41 to the service pipe 40 at a pressure drop, depending on the setting of the valve spring. 42 is a manually operable valve which, when opened after valves 22 in units 17 and 18 have been closed by the setting of knob 23 on unit 17 for, say, ten minutes and the setting of knob 23 on unit 18 for, say, fifty minutes, opens the top of the softener 33 to atmosphere through line 43, the latter with line 44 and line 45 being connected with the drain line 46. In passing, it will be understood that the flow control device extending downwardly from the cap 34 is removable with the cap but has communication with the pipe 37 when the cap is placed on the tank, as disclosed in my Patent No. 2,304,109. The same is true in the subsequent figures where there is a similar showing.

In operation, when the softener requires regeneration, the operator sets knob 23 on unit 17 for say ten minutes and sets knob 23 on unit 18 for say fifty minutes, thus opening the bottom of the tank 33 to the drain 46 through lines 39 and 45 and allowing water to drain from the tank to make room for the salt that is to be added. If the water does not drain fast enough, valve 42 may be opened for a while to allow more rapid flow, and cap 34 is then removed for introduction of salt and is thereafter replaced. These preliminary operations are easily taken care of during the ten minute interval for which knob 23 on unit 17 is set. When knob 23 on unit 17 returns to zero, valve 22 of that unit opens, allowing full flow of raw water from line 35 into the top of the softener. Valve 31 on unit 18 is adjusted to fix the rinse rate so that the salt will not be dissolved and passed through the mineral bed 38 too rapidly for good regeneration.

When knob 23 on unit 18 returns to zero, valve 22 of that unit opens and the softener is thereby returned to normal service. The mineral 38 need not be back-washed in each regeneration and the cycle has been described above, omitting the back-wash step. To back-wash the softener, the knob 23 on unit 17 alone is set for the desired back-wash time or a little longer, and valve 42 is opened and regulated to obtain the desired rate of flow for back-wash, the raw water being delivered from line 35 through bypass 41 (valve 22 in unit 17 being closed) into the bottom of the softener for flow upwardly through the mineral 38 and out through lines 37 and 43 to the drain 46. After a desired length of back-wash, the operator closes valve 42 and he either lets unit 17 run out or turns knob 23 on unit 17 at the same time back to off position to restore normal service, and if valve 42 is closed before unit 17 returns to off position, raw water from line 35 will pass through bypass valve 41 to the service line 40. The cycle for regeneration, as above described, may then follow the back-wash operation. It will be seen, therefore, that with only one valve (42) to operate and two knobs 23 on the units 17 and 18 to set, there is no danger of the operator getting confused and doing the wrong thing. There is nothing that is at all apt to get out of order, because mechanism is reduced to a minimum and the operation is substantially entirely hydraulic and automatic. Furthermore, the overall cost of such an installation is very low compared to other automatic softeners.

Referring to FIG. 2, I have shown a slight modification in which an automatic hydraulic valve 42' replaces the manually operable valve 42 and is arranged to be operated entirely automatically under pressure from chamber 28 through line 47. This valve 42' is normally held closed by pressure on diaphragm 48, keeping the drain line closed. However, when knob 23 on unit 17a is turned to a selected back-wash time, pilot valve 26 opens and relieves pressure in chamber 28 allowing valve 22 to close, and, at the same time, the diaphragm 48 has pressure thereon relieved to open valve 42', so that the operator does not have to operate this valve as he did the valve 42, the operation being taken care of entirely automatically. A fixed or adjustable orifice may be installed in the line 43 ahead of valve 42', an automatic flow regulator, such as a Dole flow control valve, shown in FIGS. 6 and 7, being indicated diagrammatically at 49. Where such a flow regulator is not provided, a manual adjustment may be provided on valve 42', allowing it to open only so far to obtain a desired back-wash flow rate, thus obtaining the same results as by regulation of valve 42 in FIG. 1.

Referring next to FIG. 5, in which control units or semi-automatic valves 17b and 18b are shown connected with a softener tank 33b and brine tank 50, this softener operates with downflow in service, upflow in back-wash, and downflow in brining and rinsing. The pipe connections between the softener tank 33b and the units 17b and 18b are similar as in FIG. 1 and include the spring loaded bypass valve 41 which enables bypassing raw water to the service system during regeneration. There are two lines 51 and 52 extending to the brine tank 50, 51 being the refill line and 52 the brine outlet line. Salt is stored dry in the tank 50, as indicated by the line representing the top of the salt bed at 53. 54 is an open bottom overflow drain at a predetermined elevation above the bottom of the tank, into the open bottom of which the upturned discharge end 55 of line 51 discharges, so that a brine level is maintained on the line XY. An open bottom drum D serving as a brine receptacle is shown in the bottom of the brine tank in accordance with the disclosure of Nickols Patent No. 2,805,922 for support of the bed of salt, the drum having openings provided in the lower portion thereof annularly arranged with respect to the tank and having other openings provided in the top thereof which are relatively restricted so that the top supports the salt bed but allows restricted fluid circulation therethrough. The brine outlet line 52 communicates with the inside of the drum. (The drum D, it should be understood, may or may not be provided, and usually is not, even though shown in FIGS. 5, 8, 9, 10, 11 and 14.) 56 is an ejector, which can be of any conventional design, connected to draw brine from the tank 50 through line 52 and check valve 57, this ejector being connected with a four-way valve 58 to deliver brine through line 59, unit 17b and line 37 to the top of the softener 33b. When the brine is delivered to the top, the bottom of the softener 33b is open to the drain line 46 through a hydraulic valve 42', regulator 49, line 60, and four-way valve 58. 61 is an extension of the raw water supply line 35 and may be considered as the nozzle of the ejector 56.

FIG. 3a shows unit 18b of FIG. 5, which it will be understood, is otherwise the same as unit 18 shown in FIGS. 3 and 4 but includes the check valve X seating outwardly with respect to the chamber 28 to prevent back flow from chamber 28 to chamber 29 and hold the diaphragm controlled valve 22 of unit 18b open during back-wash, when knob 23 on only unit 17b in FIG. 5 is set for a ten-minute back-wash as hereinafter described. However, in brining and rinsing, when, of course, the knobs 23 on both units 17b and 18b in FIG. 5 are set, the pressure in chamber 28 in both units is relieved and the valves 22 are accordingly closed automatically by diaphragms 21 and the check valves X allow flow into chambers 28 as regulated by cocks 31.

In operation, during normal service, valves 22 in units 17b and 18b in FIG. 5 are held open by diaphragms 21, and the raw water from line 35 flows through line 36, unit 17b, and line 37 into the top of the softener 33b for passage downwardly through bed 38b for softening. Softened water leaving the bottom of softener through line 39 is conducted through unit 18b to the service line 40. Here again, when the softener requires regeneration, back-washing is not necessarily a part of the cycle each time the softener is regenerated. If back-washing is omitted, knob 23 on unit 17b is set for the time required for brine draw, say, ten minutes, and knob 23 on unit 18b is set for, say, fifty minutes. Valves 22 in both units 17b and 18b are therefore closed. Four-way valve 58 is normally in the position shown, and hydraulic valve 42', which is normally held closed, is opened automatically in the manner previously described in referring to FIG. 2. Simultaneously with the drawing of brine through line 52 by the ejector 56 and delivery thereof through line 59 and line 37 to the top of the softener, raw water is delivered at about the same rate through line 51 to brine tank 50 to maintain the level XY. When the preset brine draw time runs out, knob 23 of unit 17b returns to the off position and valve 26 closes and valve 22 opens. However, valve 22 in unit 18b remains closed until knob 23 of that unit returns to the off position, and hence raw water from line 35 flowing downwardly through the bed 38b rinses the brine from the bed through line 39, valve 42', regulator 49, and line 60 to drain 46, the rinse flow volume being governed by the regulator 49. The latter is a regulator shown in FIGS. 6 and 7, having a movable perforated regulating element 62 made mostly of brass and some rubber, and having a specific gravity of approximately 7.5, sufficient to cause it to assume a lower position, as in FIG. 7, during brining, but, during rinsing, when the flow rate increases, it assumes an upper position, as in FIG. 6, against the top of the body of the regulator, where it functions to govern the rinse flow rate. When the time for which knob 23 on unit 18b has been set runs out, pilot valve 26 in unit 18b closes and valve 22 in said unit opens, while valve 42' closes to shut off the connection to the drain, and the softener 33b is returned to service. For a preliminary back-wash, the operator turns the four-way valve 58 to a position opening a passage from the top of the softener 33b to the drain 46 and turns the knob 23 of unit 17b for a selected back-wash time of say ten minutes, thereby closing valve 22 of unit 17b and opening pilot valve 26 of said unit. Check valve X in unit 18b keeps the valve 22 in that unit open by holding pressure in chamber 28. Raw water from line 35 enters the bottom of softener 33b by way of bypass valve 41 and line 39 and flows upwardly through the bed 38b and out through line 37 and line 59 to drain 46. A certain small amount of water flowing past the opened pilot valve 26 to refill line 51 will go to the drain during the back-wash but since this flow is locally through the overflow 54 there is no danger of any appreciable amount of brine being wasted. When the back-wash time has run out, the softener is returned to service, and the operator turns the four-way valve 58 manually back to the service position. Raw water may be bypassed to the service line 40 through bypass 41 when the valve 22 in either of units 17b and 18b, or both, is closed. After the back-wash, the cycle first described, consisting of brining and rinsing, may be obtained by setting knobs 23 on both units 17 and 18b.

Referring next to FIG. 8, the two control units or semi-automatic valves 17c and 18c shown here have the same connections with the top and bottom of the softener 33c, as in FIG. 5, as indicated at 37 and 39, respectively, but the hydraulically operated valve 42' in this case is connected by line 47 with the chamber 28 of units 17c in order to open to the drain 46 line 53 from unit 17c and a connecting line 64 branching from line 39. Line 65 extends from ejector 56 to line 63 and has a manual brine control valve 66 provided therein.

In opertaion, raw water from line 35 enters the top of softener 33c through unit 17c and line 37 and flows downwardly through the bed 38c for softening, the softened water leaving the bottom of the tank through line 39 and being delivered to the sevrice line 40 through unit 18c. During service, the hydraulic valve 42' is closed because pilot valve 26 in unit 17c is closed and line 47 is accordingly under full pressure. The check valve 57 prevents flow into the brine tank 50 through line 52 from the raw water service line extension 61. For back-washing, knob 23 on unit 17c is set for, say, ten minutes, thereby closing valve 22 of unit 17c and opening pilot valve 26 of this unit. Check valve X in unit 18c prevents valve 22 of that unit from closing by holding pressure in chamber 28. Valve 42' opens, due to the decrease in pressure in chamber 28 of unit 17c when the pilot valve 26 thereof opens. Raw water accordingly flows from line 35 through bypass 41 and valve 22 of unit 18c and line 39 into the bottom of the softener 33c for flow upwardly through the bed 38c. Waste water leaving the top of softener 33c is conducted through lines 37 and 63 and valve 42' to drain line 46, valve 68 serving to regulate the backwash flow as desired. The unit 67 is a spring-loaded pressure differential valve, the pressure required being that necessary to cause the ejector discharge in the next step, which is brining, to flow through the softener 33c instead of out to the drain directly. The member 62 in regulator 49 is so designed and of such weight that during brining, it is in the lower position of FIG. 7, but at the high flow of rinsing it will be lifted to the top of its chamber and will be held in contact with a seat as in FIG. 6. At 68 is indicated a back-wash flow rate regulator which may be provided as a separate unit in conjunction with the spring-loaded resistance valve 67 or provided as a part thereof, and this regulator 68 may be a manually adjustable orifice type or one having fixed orifices of selected size, or it may be in the form of an automatic regulator which delivers relatively constant flow selected at pressures from below to above those commonly encountered. It is understood that softener 33c will be back-washed only as may be required to condition the bed 38c but will be regenerated as often as the condition of the material of bed 38c may dictate. For brine draw, knob 23 of unit 17c is set for, say, ten minutes and knob 23 of unit 18c is set for, say, fifty minutes, so that valves 22 in both units are closed and brine is drawn from the brine tank 50 through line 52 by action of the ejector 56. Brine along with ejector jet flow passes through line 65 and lines 63 and 37 into the top of the softener 33c for passage downwardly through the bed 38c. Valve 42' is opened automatically by reason of the drop in pressure in chamber 28 of unit 17c, so that the bottom of the softener 33c is open through lines 39 and 64 to drain line 46. The softener is also open to the drain through line 69 to the drain to relieve pressure in chamber 28 of unit 18c when knob 23 is set for brining and rinsing, as above described. The brine draw continues until knob 23 on unit 17c returns to the off position, whereupon valve 22 in that unit opens and its pilot valve 26 closes so that pressure in the chamber 28 of unit 17c builds up sufficiently to close the valve 42'. When the brine draw ends, the rinse follows. While brine is being drawn and pilot valve 26 of unit 17c is open, valve 31 of unit 17c may be regulated to provide a flow through line 51 equal to a little bit more than the brine draw rate, excess water delivered through refill line 51 flowing out at the overflow 54. During rinsing, valve 22 of unit 18c remains closed and raw water from line 35 is delivered through line 37 to the top of the softener 33c, and waste water leaving the bottom of the softener through line 39 is conducted through check valve X into chamber 28 of unit 18c and thence through line 69 to drain line 46. Line 64 to the drain 46 is blocked by reason of valve 42' being closed. The regulation of valve 31 on unit 18c determines the correct rinse flow rate. When the preset rinse time runs out and knob 23 on unit 18c returns to the off position, valve 22 of that unit opens and its pilot valve 26 closes and the softener is returned to normal service. At any time when flow through the softener 33c is blocked by the closing of valve 22 in either of units 17c and 18c, or both, bypass valve 41 opens to allow bypassing of raw water directly from the line 35 to the service line 40.

Referring next to FIG. 9, two control units or semi-automatic valves 17d and 18d are shown connected with a softener 33d and a brine tank 50, the unit 18d being substantially the same as units 18–18c, but unit 17d having a two-way valve 22', which, when in what corresponds to the open position of valve 22, is closed to the drain line 46, but when shifted in response to pressure active on the diaphragm 21 to what corresponds to the closed position of valve 22 is opened to the drain line 46. The brine inlet fitting 70 is a closeable-openable distributor in which the poppet valve 71, which is normally closed under pressure in the tank during softening, is arranged to open to a predetermined extent for brine ejection to define a circumferentially extending slot, so that brine delivered under pressure through line 72 from the ejector 56 will be distributed substantially uniformly radially to the cross-sectional area of the bed 38d. All of the other components, such as the spring-loaded bypass valve 41, check valve 57, hydraulic valve 42', and flow regulator 49, are substantially the same as in the disclosure of FIGS. 5 and 8, but are differently arranged.

In operation, during the service run, the knobs 23 of units 17d and 18d are in their off position, so that valve 22' is closed to the left and valve 22 is open, and valve 42' is closed due to the full pressure in chamber 28 of unit 18d, which is connected through line 47 to valve 42'. Raw water from line 35 accordingly flows into the top of softener 33d through line 37 and the softened water leaving the bottom of the softener through line 39 goes to the service line 40. For back-wash, knob 23 of unit 17d is set for, say, ten minutes while knob 23 of unit 18d is left in the off position. Accordingly, valve 22' closes to the right, opening chamber 32 to the drain line 46, but valve 22 in unit 18d remains open, by virtue of the action of check valve X holding pressure in chamber 28. Raw water from line 35 is conducted through by-pass valve 41 and line 39 into the bottom of the softener 33d for passage upwardly through bed 38d. Waste water leaving the top of the softener through line 37 flows out through regulator 49 to the drain 46. Regulator 49 allows free flow in service but restricted and regulated flow in back-wash. During brining, knobs 23 on both units 17d and 18d are set, knob 23 on unit 17d for, say, ten minutes and knob 23 on 18d for, say, fifty minutes. Hence, both valves 22' and 22 close to the right. The bottom of the softener 33d is now open to the drain 46 through the line 73, and the top is open to the drain through line 37. Pressure being low in line 47, valve 42' opens and the ejector 56 is supplied with water from the raw water line 35 at full pressure, and the bed 38d is accordingly thoroughly saturated with brine from the brine tank 50 through line 52 while raw water is delivered at about the same rate to the brine tank through line 51 at the overflow 54. When the brine draw time expires and knob 23 on unit 17d returns to the off position, valve 22' closes to the left shutting off the connection to the drain 46 and at the same time opening the top of the softener to the line 35. The pilot valve 26 in unit 17d closes and with the increase in pressure in chamber 28 valve 42' also closes. The bed 38d now is being rinsed by downflow of raw water from line 37, the waste water leaving the bottom through line 39 being conducted to the drain 46 through line 73. The adjustment of the regulating valve 31 on unit 18d determines the rinse flow rate. At the end of the rinse time, knob 23 on unit 18d returns to the off position and pilot valve 26 in unit 18d closes and valve 22 opens and the softener is thus restored to normal service.

In FIG. 10 I have shown a brine tank 50' with brine draw line 52' and refill line 51' extending therein, and it will be understood that this brine tank 50' may be substituted in FIG. 9 for the brine tank 50. During brine draw, the regulating valve 31 on unit 17d is set to allow refill through line 51' at a rate approximating the brine draw. The refill water is delivered into the top of an air chamber 77 and is discharged from the open lower end 78 into the bottom of the salt bed, as indicated by the arrows. A branch 54' extending from the lower end portion of the air chamber 77 serves as the overflow 54 in brine tank 50. Of course, there is no outflow through the overflow 54' until the liquid level reaches the level XY previously mentioned. If any abnormal condition arises, such as a faulty shut-off at 26 in unit 17d, the brine tank 50' cannot overflow because the liquid level cannot rise above the outlet 54', which is connected to the drain and, because the refill line 51' ends in chamber 77 from which this overflow branches, it is mostly only raw water escaping.

In passing, it will be noticed that in this case the drum D has the refill water from line 51 discharged directly into the top thereof. Thus, during brine draw, the brine delivered to the line 52' is saturated at the outset only, its strength being gradually diminished as the brine draw continues and more and more raw water replaces the original brine in drum D. This is considered to be advantageous, because the dilution of the brine is not too abrupt, and tests run on zeolite have tended to show that the old theory that the brine used for regeneration should be saturated is wrong, because diluted brine gives as good or better results. With the present construction, the initial brine is saturated and the dilution is progressive but at a slow rate as the regeneration proceeds, thus insuring good efficiency.

In FIG. 11 are shown units 17e and 18e similar to units 17d and 18d of FIG. 9 connected with a softener 33e and brine tank 50. All of the same components are used, such as the spring-loaded bypass valve 41, hydraulic valve 42', flow regulator 49, check valve 57 and ejector 56, but one of these is connected differently, namely, hydraulic valve 42', which in this instance has the pressure active on its diaphragm 48 to hold the valve normally closed supplied through a line 47' which is connected with line 39 extending from the bottom of the softener. Thus, valve 42' remains closed during the service run because line 39 remains under substantially full pressure from line 35. However, as soon as the softener 33e is opened to the drain 46 by the setting of knobs 23 on units 17e and 18e, valve 42' opens automatically and raw water from line 35 is delivered under full pressure through ejector 56 to deliver brine from brine tank 50 into bed 38e. The operation otherwise is the same as for FIG. 9.

In FIG. 12 I have indicated how the check valve 57, ejector 56, hydraulic valve 42' and spring-loaded bypass valve 41 can all be provided as parts of one valve assembly in a single valve body 74. The screw 75 is manually adjustable to determine the spacing of diaphragm 76 relative to the throat of ejector 57 and accordingly regulate the amount of brine being injected during brine draw. Normally, the valve 42' is closed by pressure in line 27 active on diaphragm 76. Screw 75 may also be used to close valve 42' against the throat of the ejector 56, as when it is desired to open up the softener for inspection or repairs.

FIG. 13 is similar to FIG. 12 but eliminates the adjusting screw 75 and the spring-loaded bypass valve 41, all of the other components being included in a single valve body 74' as an integral valve assembly.

Referring next to FIG. 14, units 17f and 18f are similar to units 17e and 18e, respectively, in FIG. 11, line 37 extends to the top of the softener 33f and line 39 from the bottom of the softener. Here again are seen the now familiar components, such as the spring-loaded bypass or differential valve 41, check valve 57, flow regulator 49, ejector 56, and hydraulically operated valve 42' with manually operable set screw 75. While the two units 17f and 18f are shown in FIG. 14 as equipped with hand set knobs 23 independently operable, it will soon appear, as in FIGS. 15 and 16, that knob 23 of unit 17f may be replaced by dial 23a and knob 23 of unit 18f by dial 23b, and that a single control knob or program wheel 23c may be provided for turning a control dial 79, the latter being connected by flexible cables or belts 80 and 81 with the dials 23a and 23b, so that the setting of knob 23c takes care of the setting of both units 17f and 18f. The belt 80 is anchored at one end to dial 23a by means of a screw 82 which can be threaded selectively in any one of a series of circumferentially spaced holes 83, the other end of the belt 80 being secured, as indicated at 84, to the rim of the dial 79 in one of two annular grooves 85, the other annular groove 86 being reserved for belt 81. The latter has its one end secured as at 87 to the dial 79, the other end of said belt being secured by means of a screw 88 to the periphery of dial 23b similarly as at 82 on dial 23a. An index mark 89 is provided on the control knob 23c which cooperates with an index stop 90 on the panel 91 forming the front wall of a housing 92 that encloses the units 17f and 18f, as indicated in FIG. 16, leaving only the single control knob 23c exposed for manual operation.

In operation, only the unit 17f is set for back-washing, control knob 23c for this setting being turned counterclockwise, as indicated at 93 in FIG. 15. Belt 81 slacks, leaving unit 18f as is. A pin 94 projecting radially from knob 23c strikes the index projection 90 to limit the counterclockwise turning of knob 23c, so that there is no guesswork about the setting of dial 23a of unit 17f for back-washing. When the back-wash time runs out and unit 17f returns to normal, both belts 80 and 81 are taut again, dial 23a having returned to its zero or off position. For regeneration, knob 23c is turned in a clockwise direction, as indicated at 95 in FIG. 15, and, in this case, the dial 23b of unit 18f is turned clockwise through the same angularity as knob 23c but the dial 23a, having a lost motion connection with dial 70 by reason of belt 80, is not turned clockwise until belt 80, after going slack, becomes taut again, and hence dial 23a will be turned for a setting of about ten minutes when the dial 23b is set for about fifty minutes. This provides, therefore, for ten minutes brine draw and forty minutes rinse, as in the cycles previously described. By changing the anchor points 82 and 88, various combinations of brining and rinse times within the range of the timers is easily obtainable, and, while I have shown a single stop projection 94 on knob 23c, which will serve by engagement with projection 90 on one side to limit counterclockwise turning of knob 23c and by engagement on the other side of projection 90 to limit clockwise turning, I may, of course, provide two such stop projections 94—94', one for limiting counterclockwise movement and the other for limiting clockwise movement of knob 23c. In closing, it will be understood that while I have shown independently operable knobs 23 on all of the other units 17—18, 17b—18b, 17c—18c, 17d—18d, 17e—18e, the same joining together for joint operation by a single knob can be provided in each instance, as described in regard to units 17f—18f, with similar advantages.

It is believed the foregoing description conveys a good understanding of the objects and advantages of my invention. The appended claims have been drawn to cover all legitimate modifications and adaptations.

I claim:
1. In a conditioning apparatus comprising a tank containing a bed of granular liquid conditioning material and conduit means connecting the opposite ends of said tank with a source of liquid, to drain, and to a point of use, the improvement which consists in the provision of two independently settable timer valves connected together and with said conduit means for the complete control of the operation of the conditioning apparatus as its sole semi-automatic control means, namely, a first timer valve connected in fluid communication to the upper end of said tank and to said source of liquid and to said drain, and a second timer valve connected in fluid communication with the bottom of said tank and to said point of use, and to said drain, and to said source of liquid through a one-way bypass conduit, each valve comprising a valve body with a single time setting element and a valve element movable therein automatically from one position to another in response to setting of the time setting element but normally disposed in said one position, and a settable timer mechanism controlled by said time setting element and connected to set the valve element in the other position for as long as the timer mechanism is set, whereby to provide one flow circuit for an indefinite period while both valve elements are in nontimed or normal position, another flow circuit for as long as a said first timer value is set when said valve element therein is in the other position, and a third flow circuit for as long as both timer values are set when both valve elements are in the other position.

2. Apparatus as set forth in claim 1 wherein the two timer valves have setting means, the apparatus including a single settable element, and means connecting said element with each of said last mentioned means whereby setting of said element by operation in one direction to a predetermined position operates the means associated with only the first valve body for a backwash setting, and whereby operation of said element in the other direction to a predetermined position for brining and rinsing operates said means for both of said valve bodies, giving one time setting for the first valve body and another time setting for the second valve body.

3. In a conditioning apparatus comprising a tank containing a bed of granular liquid conditioning material, a brine tank, and conduit means connecting the opposite eds of said first named tank with said brine tank, a source of liquid, to drain, and to a point of use, the improvement which consists in the provision of two independently settable timer valves connected together and with said conduit means for the complete control of the operation of the conditioning apparatus as its sole semi-automatic control means, namely, a first timer valve connected in fluid communication to the upper end of said conditioner tank and to said source of liquid, to drain, and to said brine tank, and a second timer valve connected in fluid communication with the bottom of said conditioner tank and to said point of use and to said drain, and to said source of liquid through a one-way bypass conduit, each valve comprising a valve body with a single time setting element and a valve element movable therein automatically from one position to another in response to setting of the time setting element but normally disposed in one said position, and a settable timer mechanism controlled by said time setting element and connected to set the valve element in the other position for as long as the timer mechanism is set, whereby to provide one flow circuit for an indefinite period while both valve elements are in nontimed or normal position, another flow circuit for as long as said first timer valve is set when said valve element therein is in the other position, and a third flow circuit for as long as both timer valves are set when both valve elements are in the other position.

4. Apparatus as set forth in claim 3 wherein the two timer valves have setting means, the apparatus including a single settable element, and means connecting said element with each of said last mentioned means whereby setting of said element by operation in one direction to a predetermined position operates the means associated with only the first valve body for a backwash setting, and whereby operation of said element in the other direction to a predetermined position for brining and rinsing operates said means for both of said valve bodies, giving one time setting for the first valve body and another time setting for the second valve body.

5. In a time-controlled valve, a valve body having an inlet chamber, an outlet chamber, and a pressure chamber, a valve element controlling communication between the inlet and outlet chambers, means responsive to pressure in the pressure chamber operatively connected with said valve element to shift the same, timer means adapted to be set, a pressure relief valve for said pressure chamber which is normally closed but is opened when the timer means is set and is closed automatically again when the time for which the timer means is set has elapsed, and a check valve controlling communication between the inlet chamber and pressure chamber, said check valve seating toward the inlet chamber.

6. For water conditioning apparatus including a conditioning tank, an improved settable hydraulically operable control means comprising first and second automatic valves each having an inlet chamber, an outlet chamber, a pressure chamber, a valve controlling communication between the inlet and outlet chambers, means subject to pressure in the pressure chamber connected with the valve normally holding the same open but closing the same automatically upon relief of pressure in the pressure chamber, means regulating communication between the inlet chamber and pressure chamber, a settable timer mechanism, and a pressure relief valve for the pressure chamber that is normally closed on a relief port but is connected to be automatically opened by the timer mechanism when set from off position and automatically closed again when the timer mechanism returns to off position, conduit means connecting the outlet chamber of the second valve with the inlet chamber of the first valve and with a source of raw water supply under pressure, said conduit means including a one-way valve normally closing toward the first valve and raw water source, other conduit means connecting the inlet chamber of the second valve to the bottom of the conditioner tank and connecting the outlet chamber of the first valve to the top of said tank, other conduit means for connecting the outlet chamber of the second valve with a service system, other conduit means connecting the relief ports of the first and second valves with a drain, and other conduit means connecting the outlet chamber of the first valve with the drain and having an openable and closeable valve therein, one of the two first mentioned valves having its settable timer mechanism operated independently of the settable timer mechanism on the other of said two valves for backwash and both of said valves having the settable timer mechanisms thereof set at the same time in a predetermined relationship to one another for regeneration.

7. A control means as set forth in claim 6 wherein the one-way valve in the conduit means connecting the outlet chamber of the second valve with the inlet chamber of the first valve and with a source of raw water supply under pressure is operable automatically in the direction of said second valve in response to a predetermined pressure differential whereby to permit bypassing raw water to the service system automatically during backwash and regeneration.

8. For water conditioning apparatus including a conditioning tank, an improved settable hydraulically operable control means comprising first and second automatic valves each having an inlet chamber, an outlet chamber, a pressure chamber, a valve controlling communication between the inlet and outlet chambers, means subject to pressure in the pressure chamber connected with the valve normally holding the same open but closing the same automatically upon relief of pressure in the pressure chamber, means regulating communication between the inlet chamber and pressure chamber, a settable timer mechanism, and a pressure relief valve for the pressure chamber that is normally closed on a relief port but is connected to be automatically opened by the timer mechanism when set from off position and automatically closed again when the timer mechanism returns to off position, conduit means connecting the outlet chamber of the second valve with the inlet chamber of the first valve and with a source of raw water supply under pressure, said conduit means including a one-way valve normally closing toward the first valve and raw water source, other conduit means connecting the inlet chamber of the second valve to the bottom of the conditioner tank and connecting the outlet chamber of the first valve to the top of said tank, other conduit means for connecting the outlet chamber of the second valve with a service system, other conduit means connecting the relief ports of the first and second valves with a drain, and a hydraulically operable valve controlling communication between the outlet chamber of the first valve and said drain, said valve being normally held closed in response to pressure in the pressure chamber of the first valve, one of the two first mentioned valves having its settable timer mechanism operated independently of the settable timer mechanism on the other of said two valves for backwash and both of said valves having the settable timer mechanisms thereof set at the same time in a predetermined relationship to one another for regeneration.

9. A control means as set forth in claim 8 including an automatic flow control valve regulating flow from the outlet chamber of said first valve when said hydraulic valve is opened.

10. For water softening apparatus including a softener tank and a brine tank, an improved settable hydraulically operable control means comprising first and second automatic valves, each having an inlet chamber, an outlet chamber, a pressure chamber, a valve controlling communication between the inlet and outlet chambers, means subject to pressure in the pressure chamber connected with the valve normally holding the same open but closing the same automatically upon relief of pressure in the pressure chamber, means regulating communication between the inlet chamber and pressure chamber, a settable timer mechanism, and a pressure relief valve for the pressure chamber that is normally closed on a relief port but is connected to be automatically opened by the timer mechanism when set from off position and automatically closed again when the timer mechanism returns to off position, conduit means connecting the outlet chamber of the second valve with the inlet chamber of the first valve and with a source of raw water supply under pressure, said conduit means including a one-way valve normally closing toward the first valve and raw water source, other conduit means connecting the inlet chamber of the second valve to the bottom of the softener tank and connecting the outlet chamber of the first valve to the top of said tank, other conduit means for connecting the outlet chamber of the second valve with a service system, other conduit means connecting the relief port of the first valve with the brine tank to supply raw water thereto, other conduit means connecting the relief port of the second valve with a drain, a brine ejector to which raw water is supplied from the raw water supply source, other conduit means communicating with the brine ejector and brine tank for drawing brine from the latter to the brine ejector, and other conduit means extending from the brine ejector for delivery of brine to the softener tank, one of the two first mentioned valves having its settable timer mechanism operated independently of the settable timer mechanism on the other of said two valves for backwash and both of said valves having the settable timer mechanisms thereof set at the same time in a predetermined relationship to one another for regeneration.

11. A control means as set forth in claim 10 including a check valve between the inlet chamber and pressure chamber of the second valve normally seating toward the inlet chamber, whereby to trap pressure in the pressure chamber when pressure in the inlet chamber is relieved by reason of independent operation of the timer mechanism of the first valve.

12. A control means as set forth in claim 10 wherein the one-way valve in the conduit means connecting the outlet chamber of the second valve with the inlet chamber of the first valve and with a source of raw water supply under pressure is operable automatically in the direction of said second valve in response to a predetermined pressure differential whereby to permit bypassing raw water to the service system automatically during backwash and regeneration.

13. A control means as set forth in claim 10 including a check valve means in the conduit means through which brine is drawn from the brine tank to the brine ejector, said check valve means seating toward the brine tank.

14. A control means as set forth in claim 10 including another conduit means connecting the bottom of said softener tank with the drain, and shut off valve means in said conduit means, said valve means being hydraulically operable and being normally closed but openable automatically in response to relief in pressure in the pressure chamber of the second valve.

15. For water softening apparatus including a softener tank and a brine tank, an improved settable hydraulically operable control means comprising first and second automatic valves, each having an inlet chamber, an outlet chamber, a pressure chamber, a valve controlling communication between the inlet and outlet chambers, means subject to pressure in the pressure chamber connected with the valve normally holding the same open but closing the same automatically upon relief of pressure in the pressure chamber, means regulating communication between the inlet chamber and pressure chamber, a settable timer mechanism, and a pressure relief valve for the pressure chamber that is normally closed on a relief port but is connected to be automatically opened by the timer mechanism when set from off position and automatically closed again when the timer mechanism returns to off position, conduit means connecting the outlet chamber of the second valve with the inlet chamber of the first valve and with a source of raw water supply under pressure, said conduit means including a one-way valve normally closing toward the first valve and raw water source, other conduit means connecting the inlet chamber of the second valve to the bottom of the softener tank and connecting the outlet chamber of the first valve to the top of said tank, other conduit means for connecting the outlet chamber of the second valve with a service system, other conduit means connecting the relief port of the first valve with the brine tank to supply raw water thereto, other conduit means connecting the relief port of the second valve with a drain, a brine ejector to which raw water is supplied from the raw water supply source, other conduit means communicating with the brine ejector and brine tank for drawing brine from the latter to the brine ejector, other conduit means extending from the brine ejector for delivery of brine to the softener tank and including a shut off valve, other conduit means extending from the outlet chamber of the first valve and from the bottom of the softener tank to the drain, and valve means for shutting off flow in said conduit means, one of the two first mentioned valves having its settable timer mechanism operated in dependently of the settable timer mechanism on the other of said two valves for backwash and both of said valves having the settable timer mechanisms thereof set at the same time in a predetermined relationship to one another for regeneration.

16. A control means as set forth in claim 15 wherein the last mentioned valve means is hydraulically operable the same being normally closed but openable in response to relief in pressure in the pressure chamber of the one of said two first mentioned automatic valves.

17. A control means as set forth in claim 15 including a check valve between the inlet chamber and pressure chamber of the second valve normally seating toward the inlet chamber, whereby to trap pressure in the pressure chamber when pressure in the inlet chamber is relieved by reason of independent operation of the timer mechanism of the first valve.

18. A control means as set forth in claim 15 including a check valve means in the conduit means through which brine is drawn from the brine tank to the brine ejector, said check valve means seating toward the brine tank.

19. For water softening apparatus including a softener tank and a brine tank, an improved settable hydraulically operable control means comprising first and second automatic valves, each having an inlet chamber, an outlet chamber, a pressure chamber, a valve controlling communication between the inlet and outlet chambers, means subject to pressure in the pressure chamber connected with the valve normally holding the same open but closing the same automatically upon relief of pressure in the pressure chamber, means regulating communication between the inlet chamber and pressure chamber, a settable timer mechanism, and a pressure relief valve for the pressure chamber that is normally closed on a relief port but is connected to be automatically opened by the timer mechanism when set from off position and automatically closed again when the timer mechanism returns to off position, the first valve having a drain port opening into the outlet chamber, the valve controlling communication between the inlet and outlet chambers normally closing the drain port but opening the same automatically upon relief of pressure in the pressure chamber, conduit means connecting the outlet chamber of the second valve with the inlet chamber of the first valve and with a source of raw water supply under pressue, said conduit means including a one-way valve normally closing toward the first valve and raw water source, other conduit means connecting the inlet chamber of the second valve to the bottom of the softener tank and connecting the outlet chamber of the first valve to the top of said tank, other conduit means for connecting the outlet chamber of the second valve with a service system, other conduit means connecting the relief port of the first valve with the brine tank to supply raw water thereto, other conduit means connecting the relief port of the second valve with the drain, a brine ejector to which raw water is supplied from the raw water source, other conduit means communicating with the brine ejector and brine tank for drawing brine from the latter to the brine ejector, and other conduit means extending from the brine ejector to the upper portion of the softener tank for delivery of brine thereto, one of the two first mentioned valves having its settable timer mechanism operated independently of the settable timer mechanism on the other of said two valves for backwash and both of said valves having the settable timer mechanisms thereof set at the same time in a predetermined relationship to one another for regeneration.

20. A control means as set forth in claim 19 including a check valve between the inlet chamber and pressure chamber of the second valve normally seating toward the inlet chamber, whereby to trap pressure in the pressure chamber when pressure in the inlet chamber is relieved by reason of independent operation of the timer mechanism of the first valve.

21. A control means as set forth in claim 19 including a check valve means in the conduit means through which brine is drawn from the brine tank to the brine ejector, said check valve means seating toward the brine tank.

22. A control means as set forth in claim 19 including a valve controlling the delivery of raw water from the raw water source to the brine ejector, said valve means being hydraulically operable and being normally closed but openable automatically in response to relief in pressure in the pressure chamber of the one of said two first mentioned automatic valves.

23. A control means as set forth in claim 19 including an automatic flow control valve in the conduit means extending from the outlet chamber of the first valve to the top of the softener tank to regulate backward flow from said tank.

24. A control means as set forth in claim 19 includnig a valve controlling the delivery of raw water from the raw water source to the brine ejector, said valve means being hydraulically operable and being normally closed but openable automatically in response to relief in pressure in the inlet chamber of the second valve.

25. For water softening apparatus including a softener tank and a brine tank, an improved settable hydraulically operable control means comprising first and second automatic valves, each having an inlet chamber, an outlet chamber, a pressure chamber, a valve controlling communication betwen the inlet and outlet chambers, means subject to pressure in the pressure chamber connected with the valve normally holding the same open but closing the same automatically upon relief of pressure in the pressure chamber, means regulating communication between the inlet chamber and pressure chamber, a settable timer mechanism, and a pressure relief valve for the pressure chamber that is normally closed on a relief port but is connected to be automatically opened by the timer mechanism when set from off position and automatically closed again when the timer mechanism returns to off position, the first valve having a drain port opening into the outlet chamber, the valve controlling communication between the inlet and outlet chambers normally closing the drain port but opening the same automatically upon relief of pressure in the pressure chamber, conduit means connecting the outlet chamber of the second valve with the inlet chamber of the first valve and with a source of raw water supply under pressure, said conduit means including a one-way valve normally closing toward the first valve and raw water source, other conduit means connecting the inlet chamber of the second valve to the bottom of the softener tank and connecting the outlet chamber of the first valve to the top of said tank, other conduit means for connecting the outlet chamber of the second valve with a service system, other conduit means connecting the relief port of the first valve with the brine tank to supply raw water thereto, other conduit means connecting the outlet chamber of the first valve with the brine tank to deliver brine to said outlet chamber, an ejector having a suction chamber and discharge chamber, said ejector having raw water supplied thereto from the raw water supply source, the suction chamber communicating through a check valve with the inlet chamber of the second valve, the discharge chamber communicating through a check valve with the relief port of the second valve, valve means shutting off raw water through the ejector, and conduit means connecting the discharge chamber of the ejector with the drain, one of the two first mentioned valves having its settable timer mechanism operated independently of the settable timer mechanism on the other of said two valves for backwash and both of said valves having the settable timer mechanisms thereof set at the same time in a predetermined relationship to one another for regeneration.

26. A control means as set forth in claim 25 including a check valve between the inlet chamber and pressure chamber of the second valve normally seating toward the inlet chamber, whereby to trap pressure in the pressure chamber when pressure in the inlet chamber is relieved by reason of indepedent operation of the timer mechanism of the first valve.

27. Control means as set forth in claim 25 including a check valve means in the conduit means through which brine is drawn from the brine tank to the outlet chamber of the first valve, said check valve means seating toward the brine tank.

28. A control means as set forth in claim 25 including an automatic flow control valve in the conduit means connecting the inlet chamber of the second valve to the bottom of the softener tank.

References Cited in the file of this patent
UNITED STATES PATENTS

| | | |
|---|---|---|
| 1,704,982 | Lindsay | Mar. 12, 1929 |
| 2,304,109 | McGill | Dec. 8, 1942 |
| 2,597,693 | Wolcott | May 20, 1952 |
| 2,689,006 | Lindsay | Sept. 14, 1954 |
| 2,699,207 | Russell et al. | Jan. 11, 1955 |
| 2,768,950 | Kryzer et al. | Oct. 30, 1956 |
| 2,778,799 | Lindsay | Jan. 22, 1957 |
| 2,805,922 | Nickols | Sept. 10, 1957 |
| 2,855,944 | Albin | Oct. 14, 1958 |
| 2,907,462 | Webb | Oct. 6, 1959 |
| 2,948,398 | Engholdt | Aug. 9, 1960 |
| 2,985,193 | Clack | May 23, 1961 |